UNITED STATES PATENT OFFICE.

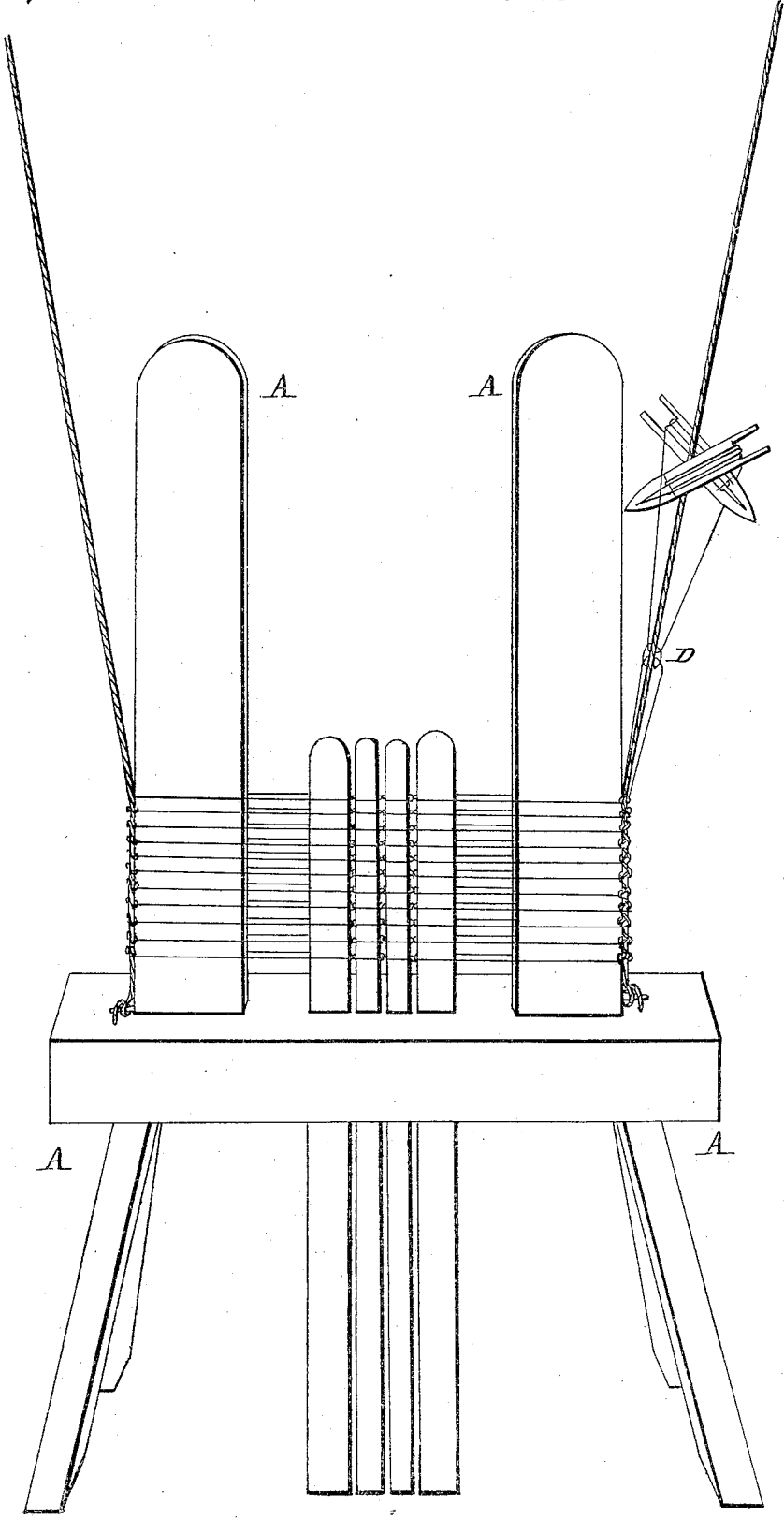

JOHN THORPE AND WILLIAM G. ANGELL, OF PROVIDENCE, RHODE ISLAND.

IMPROVEMENT IN WEAVERS' HARNESSES.

Specification forming part of Letters Patent No. 1,051, dated December 31, 1838.

*To all whom it may concern:*

Be it known that we, JOHN THORPE and WILLIAM G. ANGELL, of Providence, in the county of Providence and State of Rhode Island, have invented an Improved Weaver's Harness, of which the following is a specification.

The improvements consists in forming two or more rows of eyes through each leaf of the harness, intsead of only one—the common or usual method of making them—which is effected by forming two or more eyes in each and every heddle, and the flattening of the knots, so that the threads of the warp may pass and repass them with more ease and less obstruction than they can when the knots are left in their natural shape. Various ways and machinery may be used for flattening them; but we will mention only one way, which is on the principle of the common cloth-calender, made short for the purpose, or two wheels may be used whose circumferences run together, like the surfaces of the calender-rolls, between which the knots of the heddles are passed and by which they are pressed, making them thin and flat. These improvements are intended to make the harness more durable than the single-eyed harness, it being the eyes that wear out before the other parts of the harness are injured by wear. Therefore by having two or more tiers of eyes in each leaf of the harness, formed by making two or more eyes in each and every heddle of which the harness is composed, and by drawing the several webs first one into one row of eyes and the next into another row, and so on, shifting from one row of eyes to another as the new webs are drawn in, thus the extra-eyed flat-knot harness will be rendered far more durable than the single-eyed harness now in use.

To make this improved harness we have adopted the following method: Take two pieces of the twine, or, in other words, two spools or needles filled with the twine, one piece of which will form one half of each heddle athwart from one shaft to the other, and the other piece of twine will form the other half of the same heddles athwart from shaft to shaft, as represented in the drawing. The twine that forms the heddles and the heddles are fastened to the back-bands of the harness by forming a square knot around them—that is to say, the back-band passes through and remains in the center of said square knot, leaving every two heddles clasped into each other around said band, as shown by the letter D in the drawing. Should the heddles require a more permanent fastening, it can be done by forming another half-knot around said band. If the harness is intended to have two tiers of eyes, every heddle must have two eyes each, which we form by tying the two pieces of twine together, forming three square knots a sufficient distance from each other to give the desired length of eye, and if it is intended to have three tiers of eyes the three eyes in each heddle will be formed by four square knots, as above, and so on, according to the number of tiers of eyes required in each harness. We prefer square knots to all others, although other knots may be used to form said eyes. One piece of the twine is represented by a red line and the other piece by a blue one.

A A A A represent an apparatus on which the harness is made.

What we claim as our invention, and desire to secure by Letters Patent, is—

The addition of one or more eyes to each and every heddle over and above the single eye, forming two or more tiers of eyes through each leaf of the harness, and the flattening of the knots, for the purpose herein described, and the manner in which we fasten the twine or heddles to the back-bands of the harness, as above described.

JOHN THORPE.
WILLIAM G. ANGELL.

Witnesses:
JOHN GORHAM,
STEPHEN MARTIN.